(12) United States Patent
Scoville et al.

(10) Patent No.: US 12,405,179 B2
(45) Date of Patent: Sep. 2, 2025

(54) TORQUE MONITORING SYSTEM FOR FLEXIBLE DRIVES

(71) Applicant: SST Systems, Inc., Sturgeon Bay, WI (US)

(72) Inventors: Anthony C. Scoville, Sturgeon Bay, WI (US); Stephen C. Mann, Sturgeon Bay, WI (US)

(73) Assignee: SST Systems, Inc, Sturgeon Bay, WI (US)

( * ) Notice: Subject to any disclaimer, the term of this patent is extended or adjusted under 35 U.S.C. 154(b) by 412 days.

(21) Appl. No.: 18/173,624

(22) Filed: Feb. 23, 2023

(65) Prior Publication Data

US 2023/0332966 A1    Oct. 19, 2023

Related U.S. Application Data

(60) Provisional application No. 63/330,450, filed on Apr. 13, 2022.

(51) Int. Cl.
  *G01L 3/10* (2006.01)

(52) U.S. Cl.
  CPC .................................. *G01L 3/108* (2013.01)

(58) Field of Classification Search
  CPC .............................. G01L 3/108; G01L 3/1457
  See application file for complete search history.

(56) References Cited

U.S. PATENT DOCUMENTS

| | | |
|---|---|---|
| 2,230,745 A | 2/1941 | Eiselstein |
| 3,066,789 A | 12/1962 | Schmeck et al. |
| 3,589,504 A | 6/1971 | Blough |
| 3,680,685 A | 8/1972 | Halton |
| 3,952,864 A | 4/1976 | Schlagel |
| 3,963,115 A | 6/1976 | Teske et al. |
| 4,175,657 A | 11/1979 | Dehne et al. |
| 4,396,111 A | 8/1983 | Kent |
| 4,836,362 A | 6/1989 | Bower |
| 4,858,747 A | 8/1989 | Eunson |
| 5,040,664 A | 8/1991 | Stohr et al. |
| 5,660,267 A | 8/1997 | Buhman |
| 5,765,678 A | 6/1998 | Uranaka et al. |
| 6,137,974 A | 10/2000 | Williams et al. |
| 6,520,310 B1 | 2/2003 | Lauch et al. |
| 8,636,140 B2 | 1/2014 | Tout et al. |

(Continued)

*Primary Examiner* — Freddie Kirkland, III
(74) *Attorney, Agent, or Firm* — Michael Best & Friedrich LLP (57) ABSTRACT

A self-monitoring flexible drive system including a drive motor having an output member coupled to a flexible drive means configured to move one or more work pieces by loading the flexible drive means in tension. The drive motor is supported by a mount that fixes a position of the drive motor while allowing free rotation. A torque sensor measures torque applied to the flexible drive means by the drive motor. The torque sensor is provided by a torque arm fixedly secured with respect to a housing of the drive motor, and a load measuring support arm supporting a distal portion of the torque arm against a stationary support. A controller receives a variable non-binary output signal from the torque sensor that indicates a value of the measured torque. The controller is programmed to output a signal configured to modify an input drive signal controlling the output of the drive motor.

15 Claims, 4 Drawing Sheets

(56) References Cited

U.S. PATENT DOCUMENTS

| | | |
|---|---|---|
| 9,527,673 B2 | 12/2016 | Bogle et al. |
| 9,809,393 B2 | 11/2017 | Rimmington |
| 11,150,151 B2* | 10/2021 | Park ........................ B66B 23/02 |
| 11,839,176 B2* | 12/2023 | Isaac ..................... A01D 61/008 |
| 2002/0183148 A1* | 12/2002 | Goryca .................. B65G 43/02 |
| | | 474/102 |
| 2014/0124336 A1* | 5/2014 | Domenicucci ........... A21B 3/00 |
| | | 198/810.02 |

\* cited by examiner

TORQUE MONITORING SYSTEM FOR FLEXIBLE DRIVES

CROSS-REFERENCE TO RELATED APPLICATIONS

This application claims priority to U.S. Provisional Patent Application No. 63/330,450, filed on Apr. 13, 2022, the entire contents of which are incorporated by reference herein.

BACKGROUND

The present invention relates to conveyor systems and other powered systems with flexible drives, and more particularly relates to torque-responsive controls in such systems.

SUMMARY

In one aspect, the invention provides a self-monitoring flexible drive system including a drive motor having an output member coupled to a flexible drive means configured to move one or more work pieces by loading the flexible drive means in tension. The drive motor is supported by a mount that fixes a position of the drive motor while allowing free rotation. A torque sensor is configured to measure torque applied to the flexible drive means by the drive motor through the output member, the torque sensor provided by a torque arm fixedly secured with respect to a housing of the drive motor, and a load measuring support arm supporting a distal portion of the torque arm against a stationary support structure. A controller is configured to receive a variable, non-binary output signal from the torque sensor that indicates a value of the measured torque. In response to the signal from the torque sensor, the controller is programmed to output a signal configured to modify an input drive signal controlling the output of the drive motor.

In another aspect, the invention provides a method of operating a self-monitoring flexible drive system. One or more work pieces are moved by operation of a plurality of drive motors, each having an output member coupled to a flexible drive means such that the flexible drive means is loaded in tension in a plurality of segments between the plurality of drive motors. An uneven loading scenario in the plurality of segments is presented by one or both of: uneven spacing of the plurality of drive motors, and uneven loading from the one or more work pieces. Each of the plurality of drive motors is supported by a mount that fixes a position of the respective drive motor while allowing free rotation. With a respective torque sensor for each of the plurality of drive motors, torque applied to the flexible drive means by the drive motor through the output member is measured, the torque sensor being loaded through a torque arm fixedly secured with respect to a housing of the drive motor, and a load measuring support arm supporting a distal portion of the torque arm against a stationary support structure. With a controller coupled to the respective torque sensors and the plurality of drive motors, an input drive signal to each of the plurality of drive motors is actively adjusted to adjust the torque thereof in response to a corresponding signal output from the respective torque sensor to improve the load balance across the plurality of segments.

In yet another aspect, the invention provides a method of operating a self-monitoring flexible drive system. One or more work pieces are moved by operation of a drive motor, the drive motor having an output member coupled to a flexible drive means such that the flexible drive means is loaded in tension. The drive motor is supported by a mount that fixes a position of the drive motor while allowing free rotation. With a torque sensor, torque applied to the flexible drive means by the drive motor through the output member is measured, the torque sensor being loaded through a torque arm fixedly secured with respect to a housing of the drive motor, and a load measuring support arm supporting a distal portion of the torque arm against a stationary support structure. A controller is in communication with the torque sensor to receive an output signal therefrom and in communication with the drive motor to send a drive signal thereto. The controller is programmed with an ultimate torque limit for system operation. With the controller, the output signal from the torque sensor is used to detect an abnormal condition not associated with the ultimate torque limit, the controller responding with an alert and/or stoppage of the drive motor.

DETAILED DESCRIPTION

Before any aspects of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
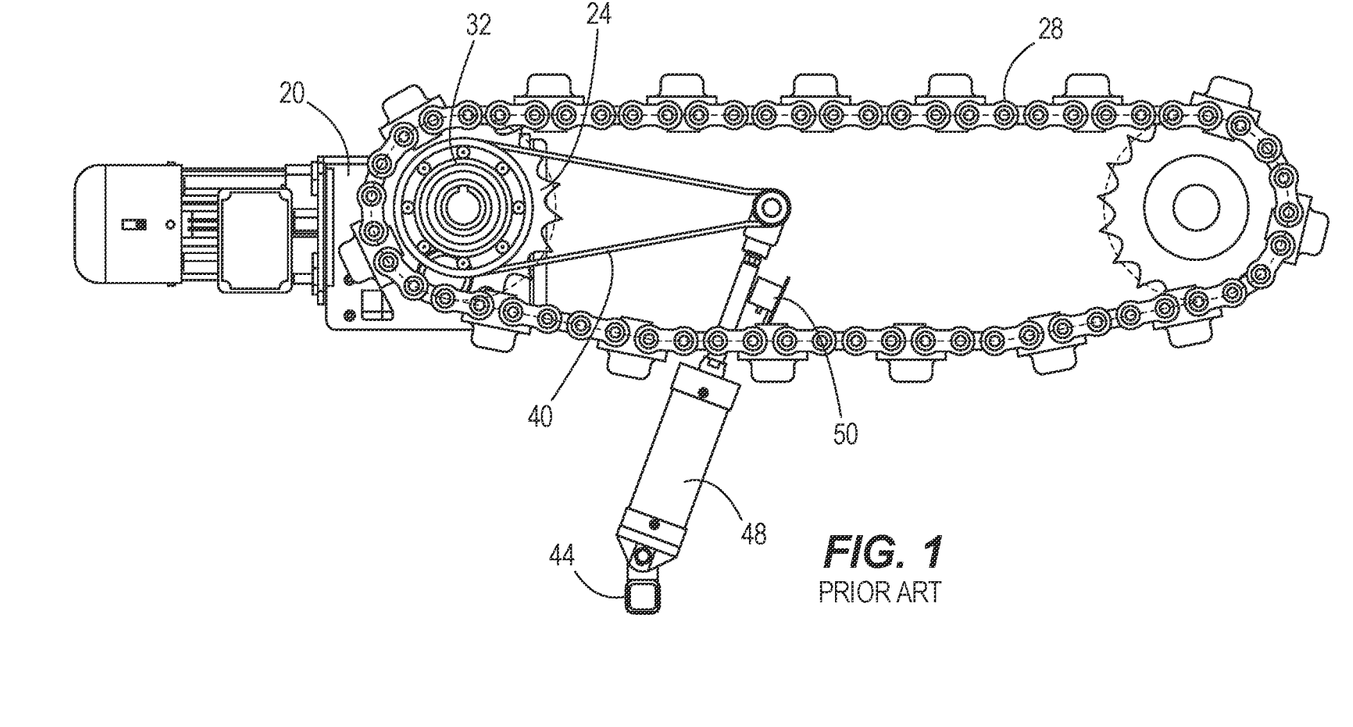
FIG. 1 illustrates a torque limiting conveyor drive system according to the prior art.

FIG. 1 illustrates a state-of-the-art system upon which the invention improves. In this conventional system, a conveyor chain 28 is wrapped about and driven by an output sprocket 24. A motor and a gearbox, together referred to as gearmotor 20 (at left) are mechanically supported in part by a fixed bearing support 32. By the fixed bearing support 32, the gearmotor 20 is positionally fixed, but supported on bearings centered along an axis of the output sprocket 24. Thus, the gearmotor 20 is free to rotate about the axis, but for the torque arm 40 that resists rotation of the gearmotor 20 as the gearmotor applies torque to the sprocket 24 and the conveyor chain 28. The torque arm 40 is supported against a fixed support 44 by an air cylinder 48 so that increasing torque from the gearmotor 20 results in increasing compression of the air cylinder 48. A limit switch 50 is configured to trip when a preconfigured amount of cylinder compression occurs—corresponding to a preconfigured amount of applied torque. A jam or other problem with the conveyor that results in a torque spike above the preconfigured limit will result in a shutdown to avoid further damage.

Figure 2:
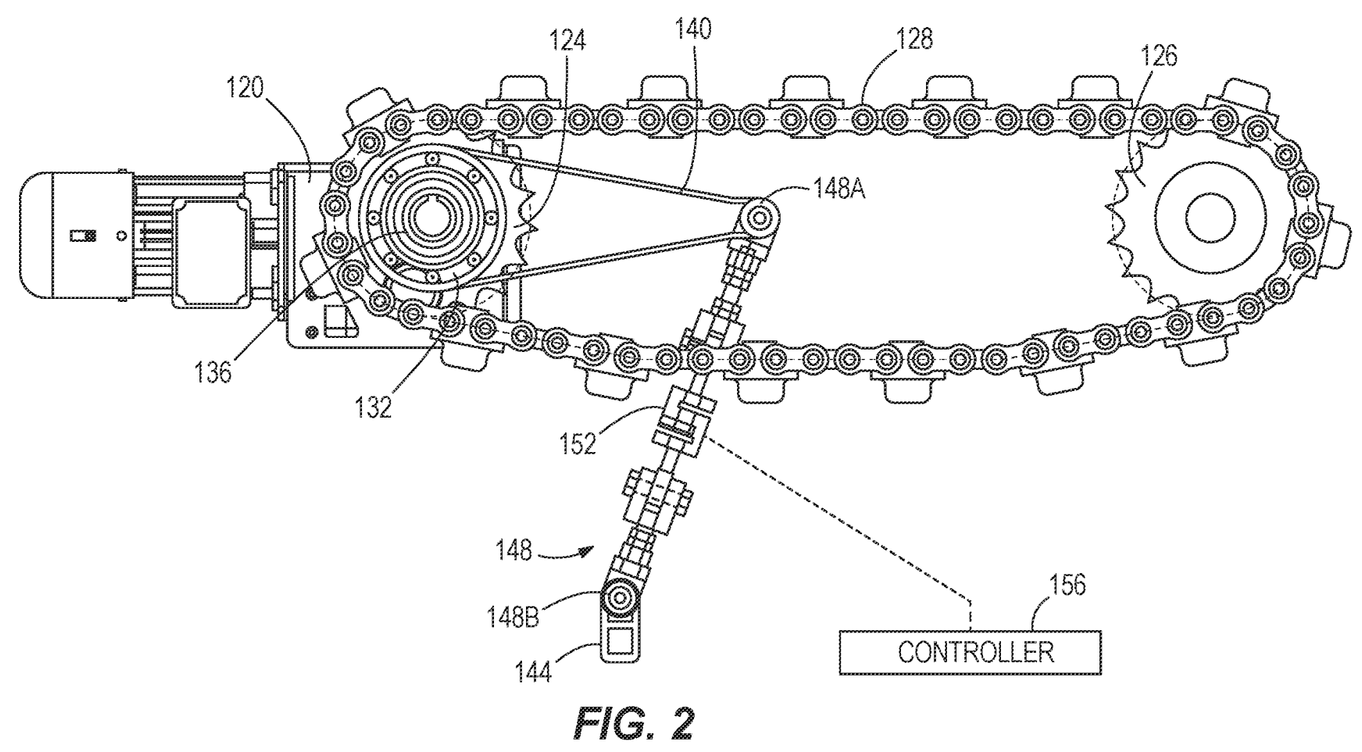
FIG. 2 illustrates a conveyor drive system according to one embodiment of the present disclosure.

FIG. 2 illustrates a system similar to FIG. 1 with improvements in the structure and function thereof. The gearmotor 120 is provided with an output sprocket 124 engaged with a conveyor chain 128 so that the torque applied by the gearmotor 120 can drive the conveyor chain 128, similar to FIG. 1. The conveyor chain 128 can extend around the output sprocket 124 and at least one more sprocket 126 to form a driven conveyor chain loop. For the purpose of simplicity in illustration, the system is shown to include only one additional sprocket 126 and a small distance between the sprockets 124, 126. In practice, the conveyor chain 128 may have a great span in length and may be engaged by multiple sprockets, including multiple non-driven sprockets 126 and/or multiple driven sprockets 124 (e.g., one or more gearmotors 120 engage the same conveyor chain 128 to drive the same). The conveyor system may include any number of driven and non-driven sprockets according to the particular need or industrial application. The gearmotor 120 is rotatably supported on a fixed support 132 (e.g., mounting flange bolted to a stationary frame of the conveyor system) by way of at least one bearing 136. Thus, the gearmotor 120 is configured to be rotatable relative to the fixed support 132 about an axis shared with the central rotational axis of the output sprocket 124. The torque arm 140 is fixedly secured to the gearmotor 120 (e.g., bolted to or integral with a housing thereof) and supported indirectly by a fixed support 144. Between the torque arm 140 and the fixed support 144 is a support arm 148 having integrated therein a torque sensor 152 operable to measure the torque exerted by the gearmotor 120 to the chain 128. At its opposite ends, the support arm 148 has pivot couplings 148A, 148B with the torque arm 140 and the fixed support 144, respectively.

In some constructions, the torque sensor 152 takes the form of one or more strain gauge load cells that operates by producing an electrical output that varies with the force or strain present in the support arm 148. Thus, torque is measured whether above or below a predetermined threshold value. Whether tension-loaded or column-loaded in compression, depending on the direction of rotation of the gearmotor 120, the load in the support arm 148 measured by the load cell correlates directly to the torque required to resist rotation of the gearmotor 120 about its rotational mounting. An electrical output signal from the torque sensor 152 is provided to an electronic controller 156 including a processor (e.g., one or more microprocessors). With the controller 156, the illustrated electromechanical system that supports the gearmotor 120 and measures the reaction torque can provide a flexible drive monitoring system. The system may be configured to measure torque in a single direction or in two directions, depending on whether the flexible drive is configured to be unidirectionally operated or bidirectionally operated. The gearmotor 120 with the output sprocket 124 is one example of a drive member, and the conveyor chain 128 is one example of a flexible drive—although aspects of the invention may apply also to other types of flexible drives as discussed in some detail below. Further, aspects of the invention may extend beyond flexible drive systems.

Figure 3:
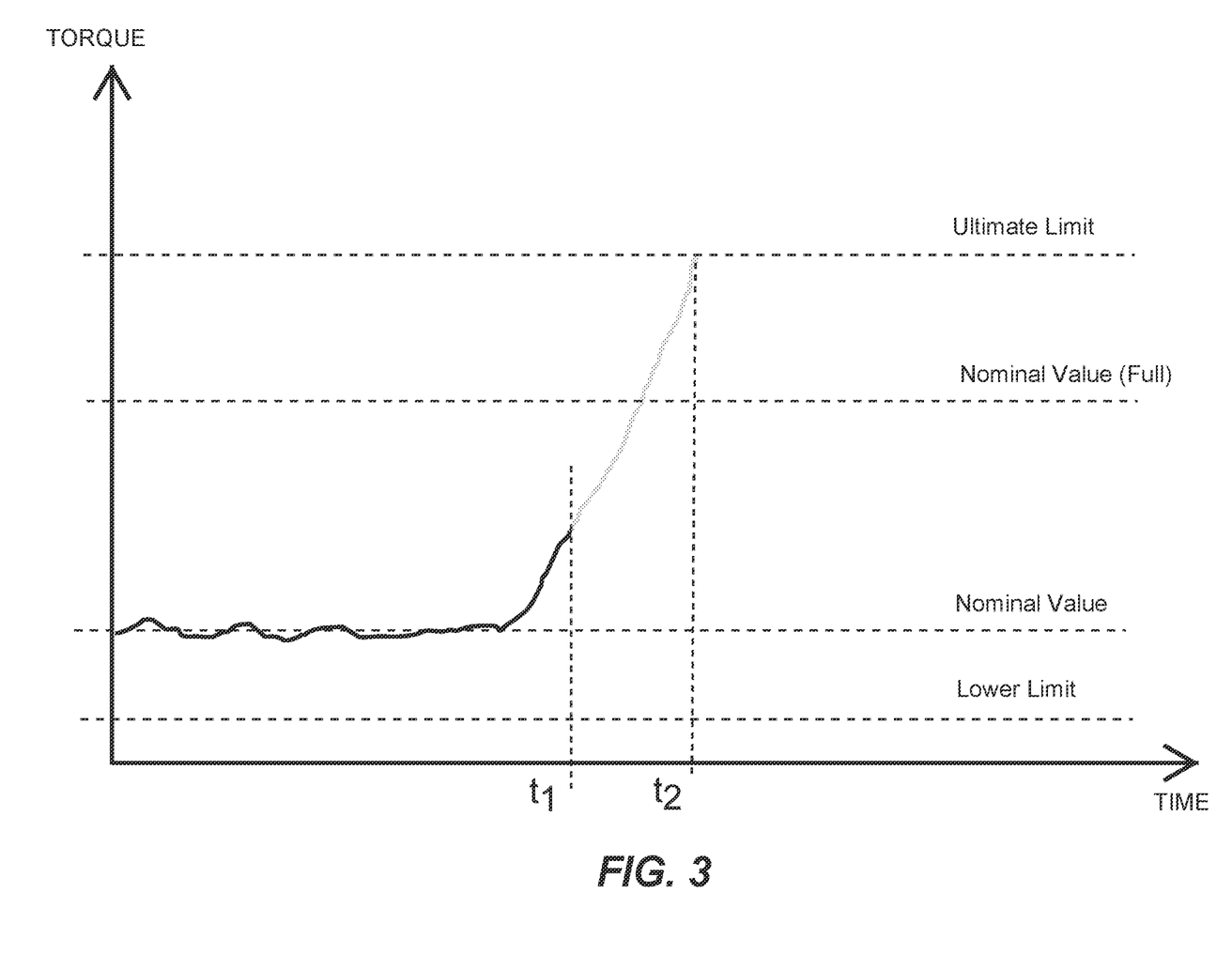
FIG. 3 is an exemplary torque vs. time plot for use of the conveyor drive system of FIG. 2.

As opposed to the controller 156 simply awaiting notification of the torque exceeding a preset threshold value, the system with the torque sensor 152 is operable to measure and report torque values periodically or continuously (e.g., in real time) for monitoring by the controller 156, even when the torque is below any preset threshold value for alerts or remedial actions. The system can be configured with one or more types of torque limits, not limited to one absolute or ultimate torque limit for the conveyor system (set at the time of installation and bound by the hardware configuration). This is especially useful when the conveyor is running with substantially less load than its full capacity. In such scenarios, where torque levels are relatively low (see the nominal value noted in FIG. 3, which is significantly below the nominal value for when the conveyor system is fully loaded), a jam resulting in a spike in torque beyond what is expected for the conveyor's load status can be detected much earlier by identifying the unexpected abnormality in torque rather than waiting until the load builds up to finally surpass the absolute limit. Again with reference to FIG. 3, the problem is identified by the controller 156 at time $t_1$ where torque has only increased to an interim trigger, substantially sooner than time $t_2$ where torque would reach the substantially higher ultimate torque limit. The problem is identified by the controller's recognition of the torque spike, for example, either the slope or rate of torque increase, or an amount of deviation from the nominal running torque preceding the spike. The controller 156 can be programmed with an algorithm to accomplish these steps. Further, the controller 156 may be programmed to distinguish torque spikes indicative of a jam from torque increases due to simply adding load to the conveyor. In addition to identifying a torque spike indicative of a jam for the controller to respond by triggering an alert and/or stopping the conveyor by setting the input drive signal to the gearmotor 120 to null, the system can be operable to enable the controller 156 to predict maintenance type problems such as lack of lubrication, failing bearings, chain wear, and/or chain guide wear. This can be accomplished by the controller 156 monitoring and logging the torque change over time at a macro level (e.g., comparing one duration of operation to another subsequent duration of operation under similar operating conditions such as speed and load). The macro duration can be multiple hours (e.g., 10+ hours, or 100+ hours). Thus, the controller 156 can identify an increase in torque over a macro time interval and respond with an alert and/or stoppage. These and any other alerts can be provided via a display located on the conveyor, at an on-site control station, and/or relayed to a remote monitoring device via wireless communication. In addition to or in lieu of visual alerts such as lights and/or messages, audible alerts can be used.

Although the torque sensor 152 can utilize one or more strain gauge load cells as described above, alternate sensor topology may be used, provided it has the ability for continuous monitoring. By continuous monitoring it is not necessary that the signal output must provide streaming real time data, but rather that it can monitor or measure in an ongoing manner, regardless of value—in contrast to a limit switch that measures nothing until a limit condition occurs. For example, a conventional pneumatic cylinder with an extendable/retractable rod can be used in some constructions in or as the support arm 148 with the torque sensor that positionally tracks the pneumatic cylinder retraction/extension (i.e., support arm length). Depending on the mechanical construction of the support arm 148, various sensor topologies may also be used for the torque sensor 152, including without limitation: rotary encoders, magnetic sensors such as Hall effect sensors, optical and/or laser.

As mentioned above, there are multiple potential uses for the system described above with the support arm 148 having the torque sensor 152 coupled to the controller 156. In some constructions, the controller 156 is programmed to monitor the output signal from the torque sensor 152 to compare against and determine wither a torque limit has been reached. When the torque limit is determined to have been reached, the controller 156 is programmed to stop the drive (e.g., cease the drive signal to the gearmotor 120). There can be several different types of torque limits programmed to the controller 156 and stored in memory: a start-up torque limit used by the controller 156 only during start-up of the conveyor, a progressive torque limit that may trigger when there is an abnormal increase in torque (e.g., average torque, not attributable to changes in loading) over a macro time duration, and an instantaneous torque limit, etc. Any and all of these torque limits can be set in relation to the mechanical construction of the conveyor system and the design loading profile.

The torque monitoring drive system described above is not limited to use for preventing excessive torque, and can in fact be used to identify a scenario in which there is not enough or "less than expected" torque. In some constructions, the controller 156 is programmed to monitor torque from the torque sensor 152 for a low torque limit that indicates a component failure (or slip) such as a chain or belt. In other words, the controller 156 can respond with an alert and/or conveyor stoppage when the torque sensed by the torque sensor 152 for a given drive command to the gearmotor 120 is less than a threshold value for normal operation.

In some constructions, product and carrier feed rates are controlled by the controller 156 based on the conveyor torque measured by the torque sensor 152. For example, the controller 156 can be programmed to maximize flow along the conveyor in relation to the amount of torque set as an acceptable limit.

Figure 4:
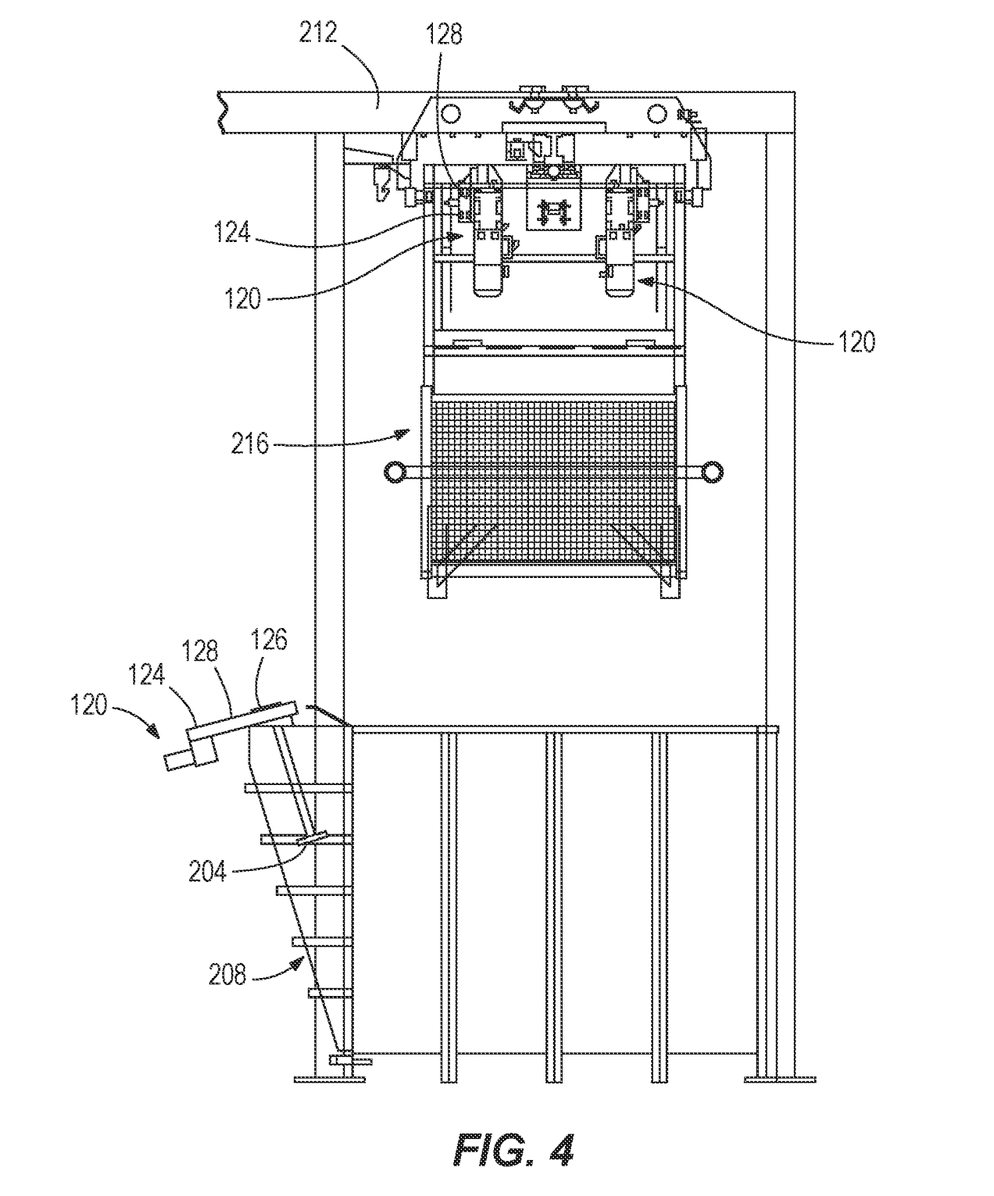
FIG. 4 is an end view of a conveyor system including hoist drives and a tank with a mixer drive.

Beyond conveyors per se, the torque monitoring drive system can be implemented in other industrial drive applications that use flexible drive members such as chains or belts. In a mixer application as shown in FIG. 4, the gearmotor 120 and the chain 128 can be coupled to the driven sprocket 126 to drive a mixing element (e.g., paddle, propeller, etc.) 204 that is in fluid communication with a fluid volume 208 of the tank or other container. The controller 156 can be programmed to control (set and/or adjust) the mixer speed, in particular the rotational speed of the mixing element 204, based on the torque signal input to the controller 156 from the torque sensor 152. This can enable the controller 156 to account for variations in fluid densities and viscosities automatically.

In conveyors and other flexible drive systems, torque is a good indicator of system friction which can be used for preventative maintenance according to some aspects of the present disclosure. A central processor (i.e., the controller 156 or another higher-level controller) can monitor the torque change over time of any particular one of a plurality of gearmotors 120 distributed throughout the conveyor system to predict when frictional forces increase over time for a particular segment of the conveyor.

An increase in baseline line torque is indicative of: a lack of lubrication, failing bearings, chain wear, and guide wear. This can be especially useful with conveyors in environments where standard bearings and chain monitoring methods will not work due to other necessities of the industrial application. The torque values can be compared to conveyor position and product position. A torque spike on a certain interval or frequency could locate a specific maintenance problem along the conveyor path. Thus, the controller can be programmed to diagnose the location and/or cause of the maintenance issue without requiring further diagnostic tests or human operator troubleshooting.

In the case of two or more drives (e.g., gearmotors 120) engaged on one common chain 128, the drives are spaced apart from each other in such a way to share the load on the chain 128. For example, two or three gearmotors 120 can be spaced equally apart to create two or three equal segments of chain. With an equally-spaced distribution of drives on the chain, equal load on all the drives occurs when the friction, or load on the chain is uniform. However, it is not practical to evenly space drives in certain configurations of machines. For example, it is unpractical to locate a drive inside an oven along the conveyor run due to the extreme heat. Thus, in some constructions, the distances may be unequal between multiple conveyor drives on a common chain.

It is also impossible in some circumstances to hang loads in a uniform manner on the conveyor chain 128 because of production demands. Furthermore, because of the random nature of loading combined with various elevation changes in conveyors, in certain instances, one drive could experience significantly more torque than the others. As the load changes on various segments, the tension in the various chain segments becomes unequal. The chain tension can become slack in some segments and overly tight in other segments. This chain tension can be affected by increasing or decreasing the speed of the gearmotors 120. Past attempts to equalize chain tension by measuring and reacting to motor torque current have failed because they react too slowly. Also, past attempts to install encoders on motors to synchronize the speed also fail to accurately distribute chain tension.

As torque can be considered proportional to power for equal speed (the entire chain 128 is one unit traveling at one speed), a torque sensor 152 according to the description of FIG. 2 provides visibility into the load condition of a given drive. With a central processor that can 1) monitor the load of each of a plurality of gearmotors 120, and 2) control the electrical power to each of the plurality gearmotors 120, a system can be created that dynamically flows power where it is needed in such a way that all the gearmotors 120 work together to share the load. In other words, drive power (e.g., signal for controlling electric motor current) can be increased to at least one gearmotor 120 where low torque is detected and/or drive power can be decreased to at least one gearmotor 120 where high torque is detected. In this context, "low" and "high" are simply terms of relative comparison, either to each other or to a predetermined value for a given system. In some cases, both types of adjustments are made at the same time—increasing power to at least one gearmotor 120 and decreasing power to at least one other gearmotor 120.

In a hoist application, the drive including the gearmotor 120 can be configured for vertical lifting and lowering of loads via the chain 128. One such example is shown in FIG. 4, where a pair of gearmotors 120 are shown coupled to an overhead hoist frame 212 for raising and lowering the load 216. For each gearmotor 120, the torque sensor 152 can be used to determine the lifted weight. The same principle applies whether there is a single gearmotor, or more than two gearmotors for the hoist. Using such a system, which operates fundamentally the same as that of FIG. 2 described above, is simpler than typical crane scales because it is a stationary device, rather than a typical crane scale that is mounted at the hook point and is required to move up and down with the load. In operation, the torque sensor 152 and the controller 156 can operate to prevent a hoist from lifting a load over its rated capacity (or any preset load capacity programmed to the controller 156). Furthermore, during automated hoist operation, the torque can be monitored to identify load changes when the load is not expected to be changing. For example, during raising or lowering the load, identifying a change in the load amount would indicate a problem that could result in the controller issuing an alert or triggering remedial actions. Likewise, a system that repeatedly handles loads of like value can be monitored at a macro level to detect gradual wear requiring maintenance attention.

In a lifting application that immerses parts into a fluid (e.g., the fluid volume 208 of FIG. 4), the lifting speed of the hoist drives can be varied based on torque reported to the controller 156 from the torque sensor(s) 152 to allow for proper drainage of the fluid from the parts. For example, by keeping the lifting torque below a prescribed level for the particular parts being dipped, the lifting speed is automatically throttled to allow the fluid to drain from the parts as they emerge from the fluid, rather than immediately lifting the parts, still full of fluid, all the way out of the fluid volume 208, which then risks more splashing and/or conveying the still fluid-laden parts away from the fluid volume 208.

What is claimed is:

1. A self-monitoring flexible drive system comprising:
a drive motor having an output member coupled to a flexible drive means configured to move one or more work pieces by loading the flexible drive means in tension, wherein the drive motor is supported by a mount that fixes a position of the drive motor while allowing free rotation;
a torque sensor configured to measure torque applied to the flexible drive means by the drive motor through the output member, the torque sensor provided by a torque arm fixedly secured with respect to a housing of the drive motor, and a load measuring support arm supporting a distal portion of the torque arm against a stationary support structure; and
a controller configured to receive a variable, non-binary output signal from the torque sensor that indicates a value of the measured torque,
wherein, in response to the signal from the torque sensor, the controller is programmed to output a signal configured to modify an input drive signal controlling the output of the drive motor.

2. The self-monitoring flexible drive system of claim 1, wherein the self-monitoring flexible drive system is provided in a conveyor system and the flexible drive means is a conveyor chain.

3. The self-monitoring flexible drive system of claim 2, wherein the drive motor is one of a plurality of drive motors, each of which is coupled to the flexible drive means and configured to move the one or more work pieces by loading the flexible drive means in tension.

4. The self-monitoring flexible drive system of claim 3, wherein the controller is programmed to control input drive signals to the plurality of drive motors for equally distributing the total load.

5. The self-monitoring flexible drive system of claim 2, wherein the controller is programmed to, when the conveyor system is operating at less than full capacity, identify a torque spike indicative of a conveyor jam prior to reaching an ultimate torque limit of the conveyor system, the controller providing an advanced alert and/or conveyor stoppage.

6. The self-monitoring flexible drive system of claim 1, wherein the self-monitoring flexible drive system is provided in a crane or hoist for lifting the one or more work pieces, and the flexible drive means is a lifting chain.

7. The self-monitoring flexible drive system of claim 1, wherein the self-monitoring flexible drive system is provided in a mixer having a fluid volume, and the one or more work pieces is a mixing device rotatable by the drive motor through the flexible drive means.

8. The self-monitoring flexible drive system of claim 7, wherein the controller is programmed to adjust the speed of the mixing device in response to the measured torque.

9. The self-monitoring flexible drive system of claim 1, wherein the drive motor is a gearmotor and the output member is a sprocket.

10. The self-monitoring flexible drive system of claim 1, wherein the torque sensor is provided by one or more strain gauge load cells.

11. A method of operating a self-monitoring flexible drive system comprising:
moving one or more work pieces by operation of a plurality of drive motors, each having an output member coupled to a flexible drive means such that the flexible drive means is loaded in tension in a plurality of segments between the plurality of drive motors;
providing an uneven loading scenario in the plurality of segments presented by one or both of: uneven spacing of the plurality of drive motors, and uneven loading from the one or more work pieces;
supporting each of the plurality of drive motors by a mount that fixes a position of the respective drive motor while allowing free rotation;
with a respective torque sensor for each of the plurality of drive motors, measuring torque applied to the flexible drive means by the drive motor through the output member, the torque sensor being loaded through a torque arm fixedly secured with respect to a housing of the drive motor, and a load measuring support arm supporting a distal portion of the torque arm against a stationary support structure; and
with a controller coupled to the respective torque sensors and the plurality of drive motors, actively adjusting an input drive signal to each of the plurality of drive motors to adjust the torque thereof in response to a corresponding signal output from the respective torque sensor to improve the load balance across the plurality of segments.

12. A method of operating a self-monitoring flexible drive system comprising:
moving one or more work pieces by operation of a drive motor, the drive motor having an output member coupled to a flexible drive means such that the flexible drive means is loaded in tension;
supporting the drive motor by a mount that fixes a position of the drive motor while allowing free rotation;
with a torque sensor, measuring torque applied to the flexible drive means by the drive motor through the output member, the torque sensor being loaded through a torque arm fixedly secured with respect to a housing of the drive motor, and a load measuring support arm supporting a distal portion of the torque arm against a stationary support structure;
providing a controller in communication with the torque sensor to receive an output signal therefrom and in communication with the drive motor to send a drive signal thereto, the controller being programmed with an ultimate torque limit for system operation; and
with the controller, using the output signal from the torque sensor to detect an abnormal condition not associated with the ultimate torque limit, the controller responding with an alert and/or stoppage of the drive motor.

13. The method of claim 12, wherein the controller uses the output signal from the torque sensor to detect the abnormal condition of applied torque below a low-torque threshold.

14. The method of claim 12, wherein the controller uses the output signal from the torque sensor to detect the abnormal condition of a torque spike in response to a jam.

15. The method of claim 12, wherein the controller uses the output signal from the torque sensor to detect the abnormal condition of a progressive macro scale torque increase over time due to gradual wear requiring maintenance attention.

* * * * *